United States Patent
Weber et al.

(10) Patent No.: US 7,341,626 B2
(45) Date of Patent: Mar. 11, 2008

(54) PIGMENT COMPOSITIONS CONSISTING OF ORGANIC AND INORGANIC PIGMENTS

(75) Inventors: Joachim Weber, Reinach (CH); Gerhard Wilker, Moerfelden-Walldorf (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 0 days.

(21) Appl. No.: 10/571,478

(22) PCT Filed: Aug. 18, 2004

(86) PCT No.: PCT/EP2004/009241

§ 371 (c)(1),
(2), (4) Date: Mar. 10, 2006

(87) PCT Pub. No.: WO2005/028564

PCT Pub. Date: Mar. 31, 2005

(65) Prior Publication Data
US 2007/0027239 A1 Feb. 1, 2007

(30) Foreign Application Priority Data
Sep. 12, 2003 (DE) .............................. 103 42 601

(51) Int. Cl.
*C09B 67/22* (2006.01)
*C09D 11/00* (2006.01)

(52) U.S. Cl. ................ 106/496; 106/31.75; 106/31.77; 106/31.81; 106/439; 106/440; 106/441; 106/448; 106/453; 106/479; 106/480; 106/493; 106/494; 106/498; 106/499; 47/57.6; 430/7; 430/108.23; 524/86; 524/99; 524/190

(58) Field of Classification Search ................ 106/432, 106/448, 453, 479, 480, 491, 493, 494, 496, 106/37.75, 31.77, 31.81, 439, 440, 441, 498, 106/499; 47/57.6; 430/7, 108.23; 524/86, 524/99, 190
See application file for complete search history.

(56) References Cited

U.S. PATENT DOCUMENTS

| | | | |
|---|---|---|---|
| 4,664,709 A | 5/1987 | Castenson | |
| 5,976,238 A | 11/1999 | Erkens et al. | |
| 6,117,606 A | 9/2000 | Macholdt et al. | |
| 6,284,035 B1 | 9/2001 | Reisacher et al. | |
| 6,475,543 B2 | 11/2002 | Kaul | |
| 6,602,342 B2 | 8/2003 | Schmidt et al. | |
| 6,872,245 B2 | 3/2005 | Grimm et al. | |
| 6,913,641 B2 | 7/2005 | Metz et al. | |
| 6,984,724 B2 | 1/2006 | Metz et al. | |
| 7,008,475 B2 * | 3/2006 | Randler et al. | 106/31.27 |
| 7,198,668 B2 * | 4/2007 | Reisacher et al. | 106/499 |

FOREIGN PATENT DOCUMENTS

| | | |
|---|---|---|
| DE | 3617010 | 2/1987 |
| EP | 0651029 | 5/1995 |
| EP | 0816440 | 1/1998 |
| EP | 0985712 | 3/2000 |
| JP | 2003-232914 A * | 8/2003 |
| WO | WO 02/055610 | 7/2002 |

OTHER PUBLICATIONS

English Translation of International Preliminary Report on Patentability for PCT/EP 2004/009241, Jul. 10, 2006.
PCT Search Report for PCT/EP 2004/009241, Nov. 16, 2004.
English Abstract for JP 09 100420, Apr. 15, 2004.
English abstract for JP 07 304985, Nov. 21, 1995.
English Abstract for JP 04 132770, May 7, 1992.

* cited by examiner

*Primary Examiner*—Anthony J. Green
(74) *Attorney, Agent, or Firm*—Richard P. Silverman

(57) ABSTRACT

A pigment composition containing one or more, organic yellow pigments selected from the group C.I. Pigment Yellow (213), Pigment Yellow (214) and disazo pigment of the formula (I)

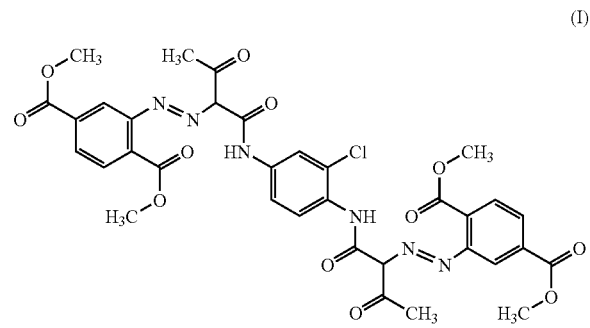

and containing one or more inorganic pigments.

10 Claims, No Drawings

PIGMENT COMPOSITIONS CONSISTING OF ORGANIC AND INORGANIC PIGMENTS

The invention relates to pigment compositions comprising organic yellow pigments with inorganic pigments and to their use for coloring high molecular weight materials.

When pigments are used for coloring high molecular weight organic materials there are exacting requirements imposed on the performance properties of the pigments, such as ease of dispersion, coating material fluidity compatible with the application, high color strength, fastness to overcoating, solvent fastness, resistance to alkali and acid, light fastness and weather fastness properties, and cleanness of hue. A further desire is that the pigments should be useful universally as far as possible for coloring other high molecular weight systems, such as plastics and printing inks, for example. Here there are further requirements, some of them asked of coating materials too, such as, for example, high fastness properties such as bleed fastness and temperature fastness properties. For coating materials and printing inks there is a desire for usefulness in both water-based and solvent-based systems. With regard to the preparation of pigment suspensions the trend is toward high pigment concentrations, and consequently there are calls for highly pigmented paints and printing-ink concentrates or millbases which nevertheless have a low viscosity.

Inorganic pigments are often distinguished by a high opacity. However, in terms of color strength or cleanness of hue, for example, they generally do not satisfy the requirements listed.

EP-A-816 440 discloses mixtures of C.I. Pigment Yellow 184 with various organic pigments.

EP-A-985 712 discloses mixtures of a multiplicity of inorganic pigments with a multiplicity of organic pigments in granular form.

WO 02/055610 discloses mixtures of organic yellow benzimidazolone pigments with yellow nickel titanate. These mixtures too fail to satisfy the requirements in some respects.

There was a need for pigment compositions which overcome drawbacks of known pigment compositions and satisfy the requirements referred to above.

The invention provides pigment compositions comprising one or more, for example, one, two or three, organic yellow pigments from the group C.I. Pigment Yellow 213, Pigment Yellow 214 and disazo pigment of the formula (I)

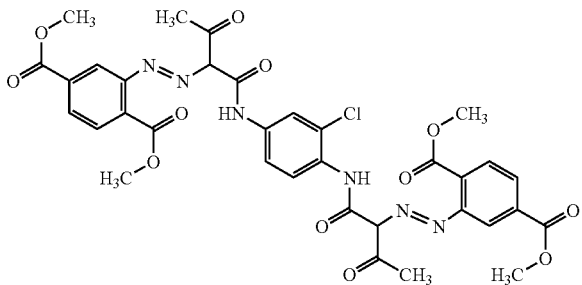

(I)

and one or more, for example, one, two or three, inorganic pigments.

Suitable inorganic pigments include titanium dioxide pigments, such as Pigment White 6, and bismuth vanadate pigments; lead chromate pigments, such as C.I. Pigment Yellow 34 or 104 or C.I. Pigment Orange 21; molybdate red or molybdate orange pigments, such as C.I. Pigment Red 104; cerium sulfide pigments, such as C.I. Pigment Orange 75 or C.I. Pigment Red 265; complex inorganic chromatic pigments, such as C.I. Pigment Yellow 53, 118, 119, 157, 158, 159, 160, 161, 162, 163, 164 or 189; C.I. Pigment Brown 24, 33, 34, 35, 37, 39 or 40, C.I. Pigment Green 50 or C.I. Pigment Blue 28, 36 or 72; and silicate pigments, such as C.I. Pigment Blue 29, C.I. Pigment Violet 15 or C.I. Pigment Red 259.

Preference is given to using complex inorganic chromatic pigments with a yellow hue and also the likewise yellow bismuth vanadate pigments.

Preferred complex inorganic chromatic pigments with a yellow hue are those with a rutile structure, such as chromium titanium yellow, such as C.I. Pigment Brown 24, chromium niobium titanate, such as C.I. Pigment Yellow 162, chromium tungsten titanium yellow, such as C.I. Pigment Yellow 163, nickel titanium yellow, such as C.I. Pigment Yellow 53, C.I. Pigment Yellow 118 and C.I. Pigment Yellow 161.

Bismuth vanadates also include bismuth vanadate/molybdates, such as C.I. Pigment Yellow 184.

In the pigment compositions of the invention the organic pigment is in particular one of the three inorganic pigments C.I. Pigment Yellow 53, C.I. Pigment Brown 24 or C.I. Pigment Yellow 184, with particular preference C.I. Pigment Yellow 184.

In the pigment compositions of the invention the organic yellow pigment is preferably C.I. Pigment Yellow 213 or the disazo pigment of formula (I), especially C.I. Pigment Yellow 213.

Particular preference is given to pigment compositions comprising C.I. Pigment Yellow 213 and C.I. Pigment Yellow 184.

The pigment compositions of the invention are of particular interest for the yellow, orange, red, blue, and green hue range, and thus generally comprise mixtures of two or more yellow pigments or mixtures of yellow pigments with orange pigments, red pigments, green pigments, brown pigments and/or blue pigments. In particular they are of interest for the yellow hue region. The pigment compositions of the invention preferably comprise two or three different pigments, in particular one of the stated organic pigments in combination with an inorganic pigment.

In the pigment compositions of the invention the weight ratio of organic yellow pigment to inorganic pigment can be 0.1:99.9 to 99.9:0.1, preferably 1:99 to 99:1, more preferably 5:95 to 95:5, and in particular 10:90 to 90:10.

The pigment compositions of the invention can be prepared in a variety of ways: for example, by mixing the dry components in granular or powder form before or after grinding, or by adding one component in moist or dry form to the other component during the operation for preparing the latter component, such as by mixing the components in the form of the moist presscakes. It is particularly appropriate to add the inorganic pigment during the operation of preparing the organic yellow pigment. The operation of preparing the organic yellow pigment embraces the diazotization of the parent aromatic amine (base), optionally the dissolution of the coupling component, and optionally its precipitation, and the mixing of the two reaction partners—diazonium salt and coupling component—which can be done by adding the coupling component to the diazonium salt or the other way round; alternatively, continuous azo coupling may be practiced. The preparation may further embrace a heat treatment of the ready-to-use coupling suspension, with or without addition of solvents and under superatmospheric pressure if desired, the isolation of the coupling product and, if desired, aftertreatment thereof in an aqueous, aqueous-organic or organic medium at elevated temperature, under superatmospheric pressure if desired, with subsequent isolation of the organic yellow pigment as a presscake and its drying, and, where appropriate, the grinding of a granular product to powder. In principle the inorganic pigment may be added at any desired point, although it is preferably added to the suspension of the organic yellow pigment prior to its final isolation.

Drying may be carried out employing the known drying equipment, such as drying ovens, bucket-wheel dryers, tumble dryers, contact dryers, and, in particular, spin flash dryers and spray dryers. Through the choice of an appropriate drying apparatus it is also possible to produce low-dust and free-flowing powders or granules.

It is also possible to prepare the pigment composition only in the course of incorporation into the high molecular weight organic medium.

The invention therefore likewise provides a high molecular weight organic medium comprising a coloringly effective amount of one or more organic yellow pigments from the group C.I. Pigment Yellow 213, C.I. Pigment Yellow 214 and disazo pigment of the formula (I), and one or more inorganic pigments, preferably pigment mixtures of the kind already stated above.

In connection with the preparation of the pigment compositions of the invention it is possible to use further, shading colorants, and auxiliaries such as, for example, surfactants, pigmentary and nonpigmentary dispersants, fillers, standardizers, resins, waxes, defoamers, antidust agents, extenders, antistats, preservatives, drying retardants, rheology control additives, wetting agents, antioxidants, UV absorbers, light stabilizers, or a combination thereof. Shading components are used usually in amounts up to 10% by weight, and auxiliaries in amounts up to 40% by weight, based in each case on the total amount of organic yellow pigments and inorganic pigments employed in accordance with the invention. In exceptional cases, however, higher amounts may also be encountered.

By fillers and/or extenders are meant a multiplicity of substances in accordance with DIN 55943 and DIN EN 971-1, examples being the various types of talc, kaolin, mica, dolomite, lime or barium sulfate. In this context it has proven particularly appropriate to make the addition prior to grinding of the pigment composition of the invention.

The pigment compositions of the invention can be employed as preferably aqueous presscakes or moist granules, but are generally solid systems of free-flowing pulverulent type or granules.

The pigment compositions of the invention can be employed for pigmenting high molecular weight organic materials of natural or synthetic origin, such as plastics, resins, varnishes, paints, electrophotographic toners and developers, electret materials, color filters, and also inks, including printing inks, and seed, for example.

High molecular weight organic materials which can be pigmented with the pigment compositions of the invention are, for example, cellulose compounds, such as cellulose ethers and cellulose esters, such as ethylcellulose, nitrocellulose, cellulose acetates or cellulose butyrates, natural binders, such as fatty acids, fatty oils, resins and their conversion products, or synthetic resins, such as polycondensates, polyadducts, addition polymers and copolymers, examples being amino resins, especially urea- and melamine-formaldehyde resins, alkyd resins, acrylic resins, phenolic resins, such as novolaks or resoles, urea resins, polyvinyls, such as polyvinyl alcohols, polyvinylacetals, polyvinyl acetates or polyvinyl ethers, polycarbonates, polyolefins, such as polystyrene, polyvinyl chloride, polyethylene or polypropylene, poly(meth)acrylates and copolymers thereof, such as polyacrylic esters or polyacrylonitriles, polyamides, polyesters, polyurethanes, coumarone-indene resins and hydrocarbon resins, epoxy resins, unsaturated synthetic resins (polyesters, acrylates) with the different curing mechanisms, waxes, aldehyde resins and ketone resins, rubber, latex and its derivatives and latices, casein, silicones and silicone resins; individually or in mixtures.

It is unimportant whether the aforementioned high molecular weight organic compounds are in the form of plastic masses, melts, or in the form of spinning solutions, dispersions, varnishes, paints or printing inks. Depending on the intended use it proves advantageous to utilize the pigment compositions of the invention in the form of a blend or in the form of prepared products or dispersions. Based on the high molecular weight organic material that is to be pigmented, the pigment compositions of the invention are used in an amount of 0.01% to 30% by weight, preferably 0.1% to 15% by weight.

In certain cases it is also possible, rather than a ground and/or finished pigment composition of the invention, to employ a corresponding crude having a BET surface area of greater than 2 $m^2/g$, preferably greater than 5 $m^2/g$. This crude can be used to produce color concentrates in liquid or solid form in concentrations of 5% to 99% by weight, alone or, where appropriate, in a mixture with other crudes or ready-to-use pigments.

The pigment compositions of the invention are also suitable for use as colorants in electrophotographic toners and developers, such as, for example, one- or two-component powder toners (also called one- or two-component developers), magnetic toners, liquid toners, polymerization toners and specialty toners.

Typical toner binders are addition-polymerization resins, polyaddition resins and polycondensation resins, such as styrene, styrene-acrylate, styrene-butadiene, acrylate, polyester and phenolic-epoxy resins, polysulfones, polyurethanes, individually or in combination, and also polyethylene and polypropylene, which may also include further ingredients, such as charge control agents, waxes or flow assistants, or may be modified subsequently with these added ingredients.

The pigment compositions of the invention are additionally suitable for use as colorants in powders and powder coating materials, particularly in triboelectrically or electrokinetically sprayable powder coating materials which are employed to coat the surfaces of articles made, for example, from metal, wood, plastic, glass, ceramic, concrete, textile material, paper or rubber.

As powder coating resins use is made typically of epoxy resins, carboxyl- and hydroxyl-containing polyester resins, polyurethane resins and acrylic resins, together with customary hardeners. Combinations of resins are also employed. For example, epoxy resins are frequently used in combination with carboxyl- and hydroxyl-containing polyester resins. Typical hardener components (depending on the resin system) are, for example, acid anhydrides, imidazoles, and also dicyandiamide and the derivatives thereof, masked isocyanates, bisacylurethanes, phenolic resins and melamine resins, triglycidyl isocyanurates, oxazolines and dicarboxylic acids.

The pigment compositions of the invention are also useful as colorants in ink-jet inks on an aqueous basis and a nonaqueous basis, and in those inks which operate in accordance with the hot-melt process.

Ink-jet inks generally contain a total of 0.5% to 15% by weight, preferably 1.5% to 8% by weight (calculated on a dry basis), of one or more of the pigment compositions of the invention.

Microemulsion inks are based on organic solvents, water, and, if desired, an additional hydrotropic substance (interface mediator).

Microemulsion inks contain generally 0.5% to 15% by weight, preferably 1.5 to 8% by weight, of one or more of the pigment compositions of the invention, 5% to 99% by weight of water, and 0.5% to 94.5% by weight of organic solvent and/or hydrotropic compound.

Solvent-based ink-jet inks contain preferably 0.5% to 15% by weight of one or more of the pigment compositions of the invention, 85% to 99.5% by weight of organic solvent and/or hydrotropic compounds.

Hot-melt inks are based mostly on waxes, fatty acids, fatty alcohols or sulfonamides which are solid at room temperature and liquefy on heating, the preferred melting range being between about 60° C. and about 140° C. Hot-melt ink-jet inks consist, for example, essentially of 20% to 90% by weight of wax and 1% to 10% by weight of one or more of the pigment compositions of the invention. Additionally present may be 0% to 20% by weight of an additional polymer (as "dye dissolver"), 0% to 5% by weight of dispersant, 0% to 20% by weight of viscosity modifier, 0% to 20% by weight of plasticizer, 0% to 10% by weight of tack additive, 0% to 10% by weight of transparency stabilizer (which prevents, for example, crystallization of the waxes), and 0% to 2% by weight of antioxidant. Additionally the pigment compositions of the invention are also suitable as colorants for color filters, both for additive and for subtractive color generation, and also as colorants for electronic inks (or e-inks) or electronic paper (e-paper).

The pigment compositions of the invention are notable for their outstanding coloristic and rheological properties, in particular their high flocculation stability, ease of dispersion, rheology, and good color strength. They can be dispersed easily and to high levels of fineness in many application media. Such pigment dispersions display outstanding rheological properties, even at high levels of pigmentation of the paint concentrates. The other above-mentioned properties as well, such as good overcoating fastness, solvent fastness, alkali fastness, light fastness and weather fastness properties, and high cleanness of hue, are very good. Moreover, the pigment compositions of the invention also include chlorine-free pigment compositions, which have the further advantage that, particularly when substrates colored with these pigments are incinerated, there is no hazard arising from chlorinated degradation products.

In order to assess the properties of the pigments in the coatings sector, in water-free, solvent-based coating systems, a selection was made, from among the multiplicity of known coating materials, of an alkyd-melamine resin varnish based on a medium-oil alkyd resin and a butanol-etherified melamine resin (AM).

In order to assess the properties of the pigments in the coatings sector in aqueous coating systems, a selection was made, from among the multiplicity of known coating systems, of an aqueous varnish based on polyurethane (PU).

The coloristic properties were determined in accordance with DIN 55986. The millbase rheology after dispersion was evaluated visually on the basis of the following five-point scale:

| | |
|---|---|
| 5 | highly fluid |
| 4 | liquid |
| 3 | viscous |
| 2 | slightly set |
| 1 | set |

The overcoating fastness was determined in accordance with DIN 53221.

The viscosity was determined, following dilution of the millbase to the final pigment concentration, using the Rossmann viscospatula type 301 from Erichsen.

In the examples below, percentages and parts are by weight, unless otherwise indicated.

EXAMPLE 1

80 parts of P.Y.184 and 20 parts of P.Y.213 are incorporated into an AM varnish system. Greenish yellow, hiding coatings with a clean hue are obtained.

EXAMPLE 2

27 parts of P.Y.53 and 3 parts of P.Y.213 are intimately mixed with one another mechanically. In the AM varnish the pigment composition gives strong greenish yellow, glossy and hiding coatings. The millbase rheology is very good and the viscosity of the masstone varnish is low. The alkali fastness and weather fastness are very good.

EXAMPLE 3

15 parts of P.Y.53 and 15 parts of P.Y.213 are intimately mixed with one another mechanically. In the PU varnish the pigment composition gives strong greenish yellow, light-colored and hiding coatings with a clean hue. The fastness to overcoating is very good.

EXAMPLE 4

12 parts of P.Y.53 and 18 parts of P.Y.213 are intimately mixed with one another mechanically. In the PU varnish the pigment composition gives strong greenish yellow, light-colored and hiding coatings with a clean hue. The fastness to overcoating is very good.

EXAMPLE 5

10.5 parts of aminodimethyl terephthalate are stirred in water and hydrochloric acid and diazotized with sodium nitrite. 100 parts of P.Y.184 are added and the pH is adjusted to 4.5 using sodium acetate. A solution of 15.3 parts of acetoacetylaminomethoxyquinoxalinedione in 250 parts of water and 10 ml of aqueous sodium hydroxide solution is added in about 40 minutes. When coupling is complete the suspension is filtered with suction and the presscake is washed free of salt. The presscake is introduced into 600 ml of N-methylpyrrolidone and the suspension is heated to 150° C. and stirred at 150° C. for 10 minutes. After cooling it is filtered with suction and the solid product is washed with N-methylpyrrolidone and then with water and dried. This gives 118 parts of pigment composition containing P.Y.213 and P.Y.184.

In the AM varnish, strong greenish yellow hiding coatings with a clean hue and high gloss are obtained. The millbase rheology is very good and the viscosity of the masstone varnish is low.

EXAMPLE 6

26 parts of P.Y.184 and 4 parts of P.Y.213 are intimately mixed with one another mechanically. In the PU varnish the pigment composition gives strong greenish yellow hiding coatings. The millbase rheology is very good. The fastness to overcoating and the weather fastness are very good.

EXAMPLE 7

3 parts of P.Y.184 and 27 parts of P.Y.213 are intimately mixed with one another mechanically. In the AM varnish the pigment composition gives strong greenish yellow, glossy and hiding coatings with a clean hue. The millbase rheology is very good. The viscosity of the masstone varnish is low.

EXAMPLE 8

28.5 parts of P.Y.184 and 1.5 parts of P.Y.213 are intimately mixed with one another mechanically. In the AM varnish the pigment composition gives light-colored greenish yellow, glossy and hiding coatings with a clean hue. The millbase rheology is very good. The viscosity of the masstone varnish is low.

EXAMPLE 9

18 parts of P.B.24 and 12 parts of P.Y.213 are intimately mixed with one another mechanically. In the AM varnish the pigment composition gives light-colored yellow and hiding coatings with a clean hue. The millbase rheology is very good. The viscosity of the masstone varnish is low. The weather fastness is very good.

EXAMPLE 10

24 parts of P.Y.184 and 6 parts of disazo pigment of the formula (I) are intimately mixed with one another mechanically. In the AM varnish the pigment composition gives strong greenish yellow, glossy and hiding coatings with a clean hue. The millbase rheology is very good and the viscosity of the masstone varnish is low. The weather fastness is very good.

EXAMPLE 11

6 parts of P.Y.184 and 24 parts of disazo pigment of the formula (I) are intimately mixed with one another mechanically. In the AM varnish the pigment composition gives strong greenish yellow, glossy and hiding coatings with a clean hue. The millbase rheology is very good and the viscosity of the masstone varnish is low. The weather fastness is very good.

EXAMPLE 12

10 parts of P.Y.53 and 10 parts of P.Y.214 are intimately mixed with one another mechanically. To assess the properties of the pigments in the plastics sector a selection was made, from among the multiplicity of known plastics, of polyethylene (PE), and injection moldings were produced. The temperature fastness of the pigment composition is very good and is above 260° C.; the deltaE at 260° C. is less than 1.0. The color strength, cleanness and lightness of the hue are high, and the warpage—i.e., the change in dimensions of the injection molding due to ageing—is low.

EXAMPLE 13

20 parts of P.Y.53 and 2 parts of P.Y.214 are intimately mixed with one another mechanically. To assess the properties of the pigments in the plastics sector a selection was made, from among the multiplicity of known plastics, of polyethylene (PE), and injection moldings were produced. The temperature fastness of the pigment composition is very good and is above 260° C.; the deltaE at 260° C. is less than 1.0. The color strength, cleanness and lightness of the hue are high, and the warpage—i.e., the change in dimensions of the injection molding due to ageing—is low.

What is claimed is:

1. A pigment composition comprising one or more organic yellow pigments selected from the group consisting of C.I. Pigment Yellow 213, Pigment Yellow 214 and a disazo pigment of formula (I)

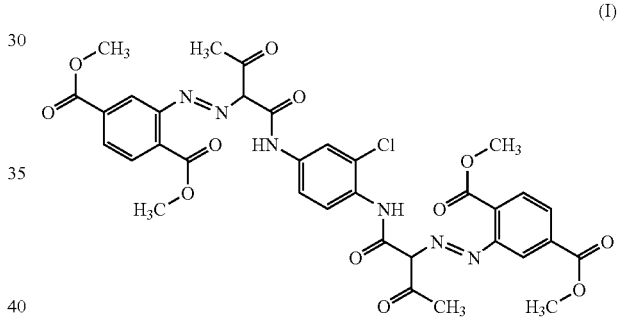

and one or more inorganic pigments selected from the group consisting of C.I. Pigment Brown 24, C.I. Pigment Yellow 162, C.I. Pigment Yellow 163, C.I. Pigment Yellow 53, C.I. Pigment Yellow 118, C.I. Pigment Yellow 161, C.I. Pigment Yellow 184 and combinations thereof.

2. The pigment composition as claimed in claim 1, wherein the one or more inorganic pigments is C.I. Pigment Yellow 184 and the one or more organic yellow pigments is C.I. Pigment Yellow 213.

3. The pigment composition as claimed in claim 1, wherein a weight ratio of the one or more organic yellow pigments to the one or more inorganic pigments is 0.1:99.9 to 99.9:0.1.

4. The pigment composition as claimed in claim 1, further comprising at least one shading colorant, and at least one auxiliary selected from the group consisting of surfactants, pigmentary and nonpigmentary dispersants, fillers, standardizers, resins, waxes, defoamers, antidust agents, extenders, preservatives, drying retardants, rheology control additives, wetting agents, antioxidants, UV absorbers, light stabilizers, and a combination thereof.

5. The pigment composition as claimed in claim 1, wherein a weight ratio of the one or more organic yellow pigments to the one or more inorganic pigments is 10:90 to 90:10.

6. A process for preparing a pigment composition as claimed in claim 1, comprising the step of mixing the one or more organic yellow pigments with the one or more inorganic pigments.

7. A process for preparing a pigment composition as claimed in claim 1, comprising the step of adding the one or more inorganic pigments during one or more synthesis steps of the one or more organic yellow pigments, wherein the one or more synthesis steps are selected from the group consisting of diazotizing, dissolving the coupling component, precipitating the coupling component, azo coupling, solvent treatment, and isolating.

8. A high molecular weight organic material of natural or synthetic origin pigmented by a pigment composition as claimed in claim 1.

9. The high molecular weight organic material of natural or synthetic origin as claimed in claim 8, wherein the high molecular weight organic material of natural or synthetic origin is selected from the group consisting of plastics, resins, varnishes, paints, electrophotographic toners, electrophotographic developers, electret materials, color filters, inks, printing inks, ink-jet inks, electronic inks, and seed.

10. A high molecular weight organic medium comprising a coloringly effective amount of a pigment composition as claimed in claim 1.

* * * * *